Aug. 24, 1948.    R. N. SABEE ET AL    2,447,541
METHOD OF MAKING PLASTIC STRUCTURE
Filed Jan. 29, 1945    2 Sheets-Sheet 1
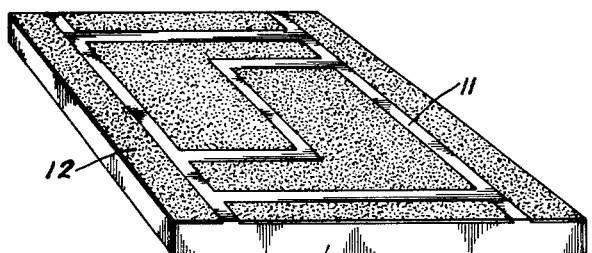
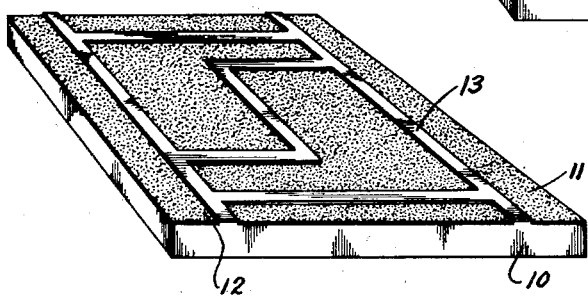
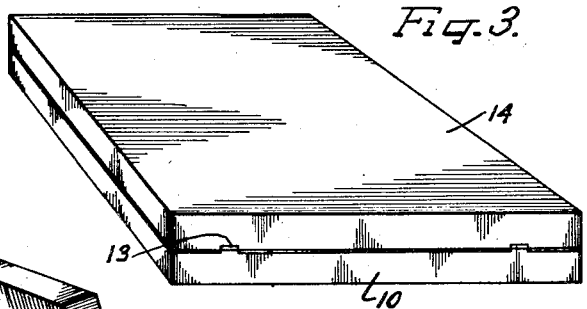
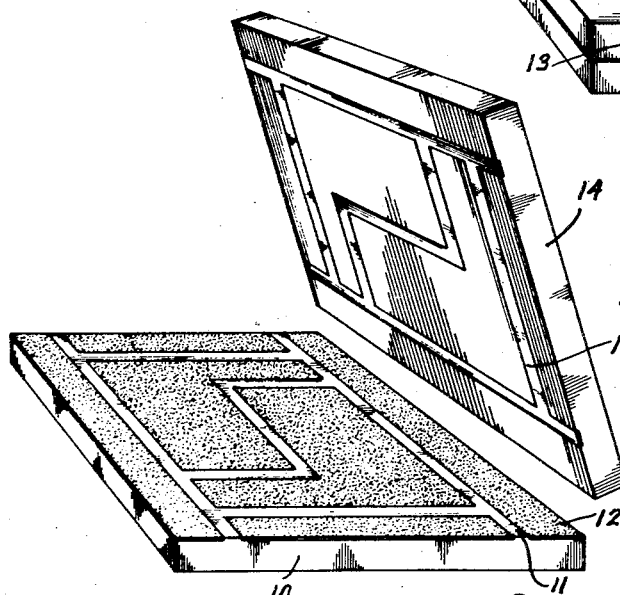
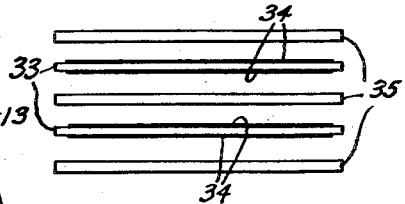
Inventors
CHARLES S. WHITE
REINHARDT N. SABEE
by The Firm of Charlesworth Attys.

Aug. 24, 1948.  R. N. SABEE ET AL  2,447,541
METHOD OF MAKING PLASTIC STRUCTURE
Filed Jan. 29, 1945  2 Sheets-Sheet 2
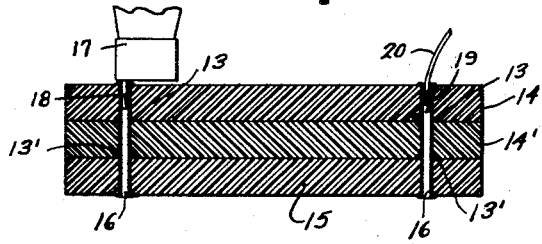
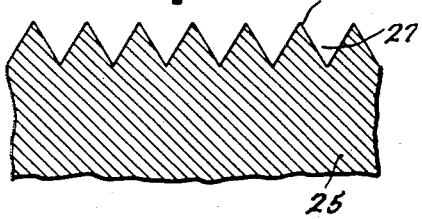   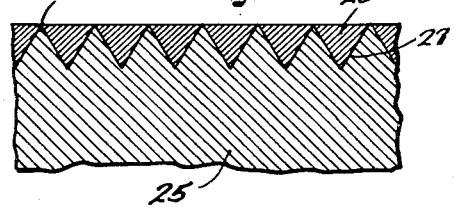
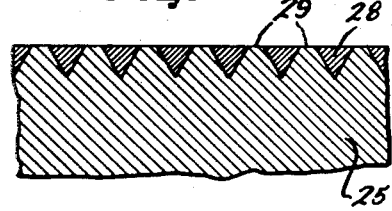   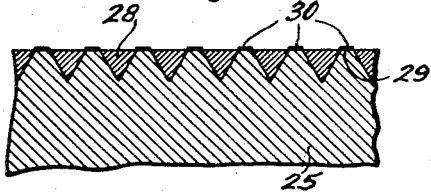
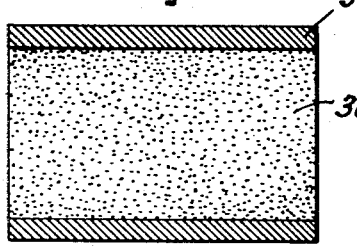   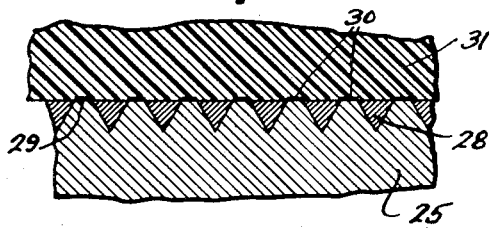
Inventor
CHARLES S. WHITE
REINHARDT N. SABEE
by The Firm of Charles Hills Attys.

Patented Aug. 24, 1948

2,447,541

UNITED STATES PATENT OFFICE 2,447,541

METHOD OF MAKING PLASTIC STRUCTURE

Reinhardt N. Sabee, Detroit, and Charles S. White, Dearborn, Mich., assignors of one-fifth to said Sabee, one-fifth to said White, one-fifth to Francis A. Grady, all of Detroit, Mich., one-fifth to Charles F. Meroni, Evanston, Ill., and one-fifth to Vernon S. Lilly, Detroit, Mich.

Application January 29, 1945, Serial No. 575,116

13 Claims. (Cl. 154—94)

This invention relates to a plastic structure and methods of manufacture.

Heretofore in the manufacture of articles embracing particles, portions and electrical conductors of metal, it has been necessary to expend a great deal of labor in fabricating the metal in a suitable carrier; and as a matter of fact, labor has been one of the main factors of expense in the ultimate product. This is true in a wide range of products.

We have selected two representative products of which the foregoing is particularly true; namely, bushings or bearings having interrupted bearing surfaces and electrical circuits of the type requiring an insulated carrier or covering. The marked differences between, for example, these two types of structures to which our present invention is applicable, readily evidences the wide range of uses to which this invention may be applied.

A bushing or bearing wherein it is desired to have an interrupted metallic bearing surface has heretofore been a very expensive item, necessitating expensive precision operations in order to effect the desired interrupted surface. For illustration, it has been found desirable, where close tolerances are to be maintained, to etch or otherwise form on the interior of a bronze sleeve thousands of small points which constitute what is called an interrupted bearing surface.

We aim, in accordance with the features of this invention and our novel process to be hereinafter described, to provide a method of providing such a bushing in which the desired interrupted surface may be directly applied to the interior surface of a suitable carrier, such for example, as a plastic sleeve. More specifically, we aim to apply directly to the inner surface of a plastic sleeve electrolytically deposited metal which may be of any form or shape irrespective of the fineness of the pattern required.

It is a further aim of our invention in another application of the same, to obviate, for example, the necessity of using covered wire in an electrical circuit, of having to solder wires together and to electrical apparatus, and of having to provide a separate chassis for the wired apparatus.

An object of this invention is to provide a structure and a method of making the same wherein a circuit is made up of predetermined patterns of metal directly applied to one or more layers of electrically non-conductive material, which structure obviates the necessity of soldered connections, and which structure in itself serves as the chassis for electrical apparatus to be interconnected by the circuit.

While the structure to which our invention is applicable is of a very diversified character, we have in accordance with the features of this invention, accomplished the same through the provision of a novel method of making an article wherein metal of a predetermined pattern is electrolytically deposited on a cathode, then directly embedded or adhered to a mass of plastic or carrier, and wherein the mass of plastic, whether it be in sheet, strip, tubular or rod form, is employed to strip the deposited metal from the cathode.

In one form of the invention, the plastic is in sheet form, and the electrolytically deposited metal stripped from the cathode by the sheet is in the form of strips, which corresponds to portions of an electric circuit of any desired magnitude or conductive characteristics.

In another form of the invention, still utilizing the fundamental features of our novel method, but wherein the article is in the form of a sleeve of plastic, the steps of the method embrace electrolytically depositing metal in a predetermined pattern, such for example, as closely spaced points, diamonds, squares, lines and the like, and applying a sleeve of plastic to the cathode and stripping the sleeve from the cathode with the pattern of metal, embedded in or adhering to the inner surface of the sleeve.

In accordance with still other features of the invention, as applied to the form of the invention embracing the method of applying electrolytically deposited metal of predetermined pattern to a plastic sheet, the steps thereof may be supplemented by additional steps such as pressing together a plurality of these sheets each having a different pattern of metal thereon and electrically interconnecting the metal patterns so that the ultimate product comprises a base or a chassis for an elecrical apparatus, such as a radio, and wherein the parts of the apparatus may be electrically connected to the circuit embodied in the sheets without the necessity of using any soldered connections.

While we have disclosed our invention as being embodied in two principal forms, one of tubular configuration and the other of sheet construction, it is to be understood that our invention is not to be thus limited but only insofar as defined by the claims hereto appended.

Other objects and features of this invention will more fully appear from the following detailed description taken in connection with the accompanying drawings which illustrate several embodiments thereof, and in which Figure 1 is a somewhat diagrammatic perspective view of a cathode plate having a predetermined exposed pattern on which metal is to be electrolytically deposited, the portion between the strips of the pattern being covered by a "resist" or non-conductive material;

Figure 2 is a view similar to Figure 1, showing metal deposited on the exposed resist-free portions of a cathode plate;

Figure 3 is a diagrammatic perspective view, illustrating how a mass or sheet of plastic is applied to a cathode plate for the purpose of stripping the metal deposit therefrom;

Figure 4 is a diagrammatic perspective view showing the cathode plate and the plastic sheet in separated condition with the deposit embedded in the plastic;

Figure 5 is a diagrammatic view illustrating how a plurality of plastic sheets with different deposits thereon having aligned portions are electrically interconnected by metallic sleeves formed to cooperate electrically with pieces of apparatus, such as prongs of a radio tube or terminals of a conductor;

Figure 6 is a diagrammatic view of a rod which may be of solid or tubular form and has a knurled surface;

Figure 7 is an enlarged fragmentary cross sectional view of a portion of Figure 6, illustrating the spaced high points of the knurled surface;

Figure 8 is a fragmentary sectional view similar to Figure 7, illustrating how the spaces between the high points of the knurled surface may be filled in with a resist or non-conductive material;

Figure 9 is a fragmentary sectional view similar to Figure 8, illustrating how the surface may be ground down or honed to provide spaced conducting points separated by the resist material;

Figure 10 is a view similar to Figure 9, showing how the metal is deposited on the exposed points separated by the resist material;

Figure 11 is a fragmentary view illustrating how a mass of plastic such as a tubular sleeve may be applied to the rod of Figure 10 after the metal has been electrolytically deposited thereon and showing how the deposits of metal become embedded in the plastic;

Figure 12 is a cross-sectional view through the sleeve illustrating how the interior of the surface provides a metallic interrupted bearing consisting of the deposits of metal embedded therein; and Figure 13 is a diagrammatic illustration of a further modification of the invention.

It is believed that the several forms of the novel articles of manufacture made possible by the use of the processes of our invention will be fully understood from the following description of the processes as used in making flat and tubular composite plastic and metal structures.

The reference character 10 designates generally a cathode plate, which may be of any suitable or conventional material, such, for example, as stainless steel. As is well known, in electrolytically depositing metal the cathode may be provided with any suitable design, which design may be either in relieved or raised form. The spaces separating the portions of the pattern in which no metal is to be deposited are filled with what is called in the trade a "resist" or a non-conductive material. For illustration, the resist may comprise any one of the well known materials for this purpose, such, for example, as a non-conductive acid resisting lacquer or paint, porcelain, rubber or some types of plastic.

We propose to recess by etching or otherwise in the usual way the portion of the plate on which no metal is to be deposited leaving the pattern 11 in a raised form on the plate. This pattern may be of any suitable configuration, such for example, as strips so arranged as to constitute the pattern for an electrical circuit or the like. The recessed portions on which no metal is to be deposited are filled in with a non-conductive or resist material, designated generally by the reference character 12.

It is of course understood that all exposed surfaces on the cathode plate on which no deposit is to be made may be coated with resist or non-conductive material.

The cathode is suspended in the usual way by hooks or the like in a conventional electrolyte and connected in the usual way for the deposit of metal, such as copper, thereon. The silver or copper, as is clear, is only deposited on the conductive pattern 11 and such deposit is designated by the reference character 13 in the accompanying drawings.

As is well known in the electrolytic metal depositing arts, the depositing of the metal can be so controlled so as to obtain any degree of thinness of deposit desired on any portion of the design consistent with the ultimate requirements to which the deposited metal is to be put. We contemplate that the pattern in this form of the invention shall be of such configuration and conductivity as to constitute an electrical circuit or a portion thereof. In other words, the strip-like deposits of copper will take the place of wires in an electrical apparatus or radio if the product of our invention is utilized. The character and extent of the deposit can be mathematically determined with precision consistent with the requirements of the circuit which is to be made up by the deposit.

In the illustrated embodiment, it will be perceived that due to the fact that the top of the plate is relatively smooth, the copper deposit 13 will project beyond the normal plane of the surface. Thereafter a mass or sheet 14 of plastic material, preferably of synthetic plastic, is pressed onto the plated surface of the cathode plate 10. Any suitable synthetic plastic may be employed, such, for example, as vinyl resin or ethyl cellulose plastics. The plate 10 and the sheet of plastic 14 thereon may be pressed together in a suitable press, and if so desired, heat may be employed to augment the pressing action. It will be perceived from Figure 3 that as a result of this pressing action, the metallic deposit 13 is embedded in the surface of the plastic sheet 14 facing and contiguous with the plated surface of the cathode 10.

Thereafter we find that we can strip the plastic sheet 14 from the cathode plate 10, leaving the cathode plate 10 in its original form prior to plating, and with the metallic pattern 13 adhering to the plastic sheet 14. It will be appreciated that the metallic pattern 13 may be of any extent or design consistent with the ultimate requirements of it and the use to which it is to be put. Moreover, due to the fact that the deposit 13 may be of a very fine and fragile nature, the pressing of it directly onto the plastic avoids any necessity for manually handling or removing it from the cathode, which would be very difficult particularly if the pattern were a very fragile one.

In addition, it will be further understood that electrolytically deposited copper is very pure copper and hence lends itself admirably to form an electrical circuit. The electrolytic process can be so controlled that a copper deposit of any fineness or electrical conductive characteristics can be obtained. In fact, one sheet may be provided with a deposit of one pattern of predetermined electrical characteristics and another sheet may have a design of a different pattern of different electrical characteristics.

The circuits or portions of circuits embraced by the several deposits on different sheets may be so predetermined and arranged to cooperate with each other in an ultimate pile-up or assembly of sheets into a common unit with the metallic deposit in contact with the surface of another sheet. In Figure 5, we have illustrated such a common unit wherein two sheets of plastic 14 and 14' are placed one above the other, each sheet having a deposit of a different electrical design, and with portions adapted to vertically align with each other for electrical connection. In the upper sheet, it will be perceived that portions of the deposit 13 are aligned with portions of the deposit 13' of the lower sheet 14'. An additional sheet of plain plastic 15 may be provided, if it is so desired, to serve as a bottom ply for the pile-up, although the use of such a sheet is optional. The various layers may be pressed together under suitable pressure and heat and joined by suitable binders to integralize the sheets.

Thereafter the aligned portions of the metal deposits 13—13' may be electrically interconnected by punching holes through the portions and inserting metal eyelets transversely through the plies. These eyelets may be so arranged as to, for example, receive the prongs of a radio tube. We have illustrated such a tube at 17 and have shown one of its prongs 18 inserted in one of the metal sleeves 16. The other sleeve 16 may have inclined metal tangs or prongs 19 therein for wedgingly gripping the end of a wire conductor 20. This arrangement, as is evident, obviates the necessity for any soldered connections.

Thus the pile-up of sheets shown in Figure 5 not only comprises in them an electrical circuit, but in addition serves as a base or chassis for an electrical apparatus, whether the apparatus be in the form of a radio, a control panel, a television set or the like. In any event, the predisposition of the electrical deposits is such that they may all be intertied and electrically connected by metal inserts or sleeves. A circuit is thus made available for the connection of pieces of electrical equipment thereto by the means of insertion of terminals in the metal sleeves in much the same way as a plug is introduced in a socket of a telephone switch-board.

While we have for purposes of illustration shown a circuit as being embodied in several layers of plastic material, it, of course, will be understood that the invention can be used equally well with one layer or with any number of layers depending upon the extensiveness of the circuit involved or the compactness of the base or chassis desired.

In Figures 6 to 12, inclusive, we have illustrated our process as applied to a different form of the invention where the ultimate article produced is of tubular form. In carrying out this process a cathode in the form of a rod 25 is used. This rod may be of any suitable conducting material, such, for example, as stainless steel, copper, or the like. It may be of tubular or rod form.

In carrying out the features of this invention, this rod 25 is first knurled at 26 on its exterior surface. The knurling may be of any predetermined configuration or extent consistent with the requirements of the ultimate product. The knurling results in the surface of the rod having high points separated by grooves 27, which grooves may be filled with a resist or non-conductive material 28 as shown in Figure 8. After this the glazed portion of the rod is honed or ground to the configuration shown in Figure 9, in which the high points have been cut off, leaving the flat conductive spaced surfaces 29 separated by the filling or resist. The flat points may be of any desired configuration. Thereafter this rod is suitably suspended in the usual electrolyte or plating bath and copper or silver deposits 30 of predetermined extent and thickness are applied to the flattened portions 29.

After the removal of the rod with the deposits 30 from the electrolyte, a mass of plastic material similar to that of the previous described sheet 14 is applied over the exterior surface of the rod 25. This mass of plastic designated by the reference numeral 31 and as shown in Figure 11, upon being pressed and formed against the surface, firmly attaches itself to the metal deposits 30. Thereafter the sleeve of plastic 31 is slipped end-wise off of the rod 25, and as shown in Figure 12, has embedded in its internal surface the points or dots of metal comprising deposits 30. Thus there is provided a bushing or bearing of synthetic plastic material having an interrupted bearing contact surface on its internal side. It is understood that the spaced deposits 30 may be of any desired configuration, such for example, as dots, dashes, squares, diamonds, lines and the like. In other words, the surface of the cathode rod may be initially cut to provide any pattern of spaced metal points desired in the ultimate bushing. This arrangement is such that deposits of metal may be effected in which the deposits may be spaced thousandths of an inch apart. In other words, the internal surface of a plastic bushing 31 may appear to be a continuous surface of metal, but in reality will comprise thousands of spaced metal portions 30 thereby providing a self-lubricating anti-frictional bearing surface.

The plastic employed in carrying out our invention may be in sheet or powder form, since the invention lends itself to the pressing and heating of the plastic to any desired ultimate shape.

While we have illustrated in Figures 11 and 12, application of our invention to the inner surface of a bearing element, it will, of course, be appreciated that the deposits of metal 30, as shown in Figure 10, could be applied to an external surface of plastic by using the embodiment of the invention shown in the first form.

Also in the form as in the previous one the metal deposit on the plastic is adapted to contact the surface of another member when put in to use. That is to say, when the bearing is mounted around a rod, shaft or the like bearinged therein the copper deposit contacts the surface of such member.

In both forms of the invention, however, the design of electrolytical metal deposits are predetermined on the cathode and are stripped directly from the cathode by means of a carrier in the form of plastic going to make up the ultimate product, which is a composite of plastic and metal. In both forms the process lends itself to any degree of fineness or precision of design of deposit desired, as there is no manual intermediate operation required to remove the deposit from the highly polished stainless steel cathode. In the one form the process makes possible a substantially flat or sheet-like composite plastic and metal article; and in the second form, makes possible a tube-like cylindrical or rod-type composite plastic and metal article.

It is also contemplated that the composite article of Fig. 12 could be manufactured in other ways. For example, the interrupted metal bearing area 30 could be in the form of a prefabricated tubular mesh of metal, such as silver, iron or copper, which mesh could be supported about a rod while the plastic outer sleeve 31 is pressed and formed therearound. Thereafter, the sleeve 31, with the interrupted metal area 30 is slipped endwise off the supporting rod.

It should be further understood that the metal area 30 could comprise an electrical circuit, as in the first form, in which event a tubular electric unit is provided which could be employed in nested relationship with similar but different size tubes to provide a build up of interconnected circuits, as in Fig. 5, but only in tubular form. The flat form of Fig. 5, however, is deemed preferable as it lends itself to use as a base or chassis in electrical, radio, television or radar apparatus.

In Figure 13 we have illustrated a still further modification of the invention, wherein a multiple of cathode plates 33—33, each having metallic deposits 34—34 on both sides thereof of any predetermined configuration, are sandwiched between a plurality of plastic sheets 35. The plastic sheets 35 may be of material similar to that of the previously described plastic sheet. Similarly the cathode plates 33—33 may be of material similar to that of the previously described cathodes, such as the cathode 10.

The multiple of sheets shown in Figure 13 are adapted to be pressed together in a suitable press in the same manner as we have described in the first form of the invention. After the pressing operation the sheets are separated so that the plastic sheets 35—35 strip the metallic or copper deposits 34—34 from the cathodes. This arrangement is desirable from the standpoint of augmenting the productivity of the cathode plates and enabling metal to be removed from both sides thereof simultaneously. The cathode deposits 34—34 may be of any suitable configuration, such as an electrical circuit of the type described in connection with the preferred form of the invention.

Thereafter the plurality of plastic sheets may be pressed together or against other plastic sheets in the manner like that described in connection with Figure 5.

What we claim is:

1. In a method of making a plastic article the steps of applying to a metallic cathode an electrical resist material in such form as to leave exposed a predetermined interrupted discontinuous pattern of metal, electrolytically depositing on said exposed interrupted pattern a predetermined amount of metal, embedding the metal deposit in a given surface of a plastic and stripping the plastic and metal deposit from the interrupted metal cathode.

2. In a method of making a plastic article the steps of applying to a metallic cathode an electrical resist material in such form as to leave exposed a predetermined discontinuous pattern of metal in the form of strips, dots and the like, electrolytically depositing on said exposed discontinuous pattern a predetermined amount of metal, embedding the metal deposit in a given surface of a plastic and stripping the plastic and metal deposit from the metal cathode with the metal deposit in position for contact with the surface of another member.

3. In a method of making a plastic article, the steps of electrolytically depositing a predetermined deposit of metal on a rod-like cathode and embedding the metallic deposit in an inner surface of a sleeve of synthetic thermoplastic material formed about the rod.

4. In a method of making a plastic article, the steps of electrolytically depositing a predetermined pattern of metal on one or more sides of the plate-like cathode, removing the article with the deposit thereon from the electrolyte, pressing one or more sheets of plastic against the cathode containing the deposit, stripping the plastic with the deposit adhering thereto from the cathode, thereafter pressing each plastic sheet with the deposit thereon against another plastic sheet having a predetermined pattern of metal thereon to join the sheets into a unitary article and interconnecting the metal pattern of one plastic sheet with that of the other.

5. In a method of making a plastic article such as an anti-frictional bushing, bearing and the like, the steps of electrolytically depositing a predetermined pattern of metal on a cylindrical cathode, removing the cathode with the deposit of metal thereon from the electrolyte, pressing a mass of plastic about the cathode to attach the deposit thereto and stripping the tubular mass of plastic from the cathode with the deposit of metal on the inner surface of the plastic thereof.

6. In a method of making a plastic article such as an anti-frictional bushing, bearing and the like, provided with an interrupted metallic bearing surface, the steps of electrolytically depositing a predetermined pattern, such as dots, diamonds, squares and the like, on a rod-like cathode, removing the cathode with the deposit of metal thereon from the electrolyte, pressing a sleeve of plastic about the cathode to attach the deposit thereto, and stripping the metal sleeve of plastic from the cathode with the deposit of metal on the inner surface of the plastic sleeve in the form of an interrupted metallic surface.

7. In a method of making a plastic article such as a sleeve with an interrupted metallic bearing area on its inner surface, the steps of shaping a mass of synthetic thermoplastic material into the form of a tube of predetermined size and contemporaneously therewith incorporating in the inner surface of the tube an interrupted area of metal dots, spaced lines, and the like, of predetermined pattern.

8. In a method of making a plastic article, the steps of electrolytically depositing a predetermined pattern of metal on one side of a plate-like cathode, removing the cathode with the deposit thereon from the electrolyte, pressing a sheet of plastic against the surface of said cathode containing the deposit, stripping the sheet of plastic with the deposit adhering thereto from the cathode, pressing said plastic sheet with the deposit thereon against another plastic sheet having a predetermined metal deposit, and forming transverse connections between the deposits to connect them together in a predetermined arrangement.

9. In a method of making an article adapted to have movable bearing contact with another member, the steps of first applying a metal pattern in a form of a plurality of very closely arranged dots, diamonds, lines and the like, to a temporary carrier element, thereafter applying a mass of material, to comprise part of the ultimate product against the temporary carrier element and then stripping said mass of material from the temporary carrier element with the metal pattern adhering to the mass and forming an interrupted metal bearing surface thereon.

10. In a method of making a composite article including coating a cathode with a plating resist to leave a portion of the cathode exposed and which portion has a predetermined design and plating metal from an anode onto only said exposed portion of the coated cathode to form a given pattern of metal, the steps of depositing plastic material on substantially the entire surface of the coated and plated cathode to embed the plated metal pattern in the plastic and stripping the plastic from the cathode with the metal pattern embedded therein and held by the plastic in the form of said predetermined given design.

11. In a method of manufacturing composite plastic and metal articles, the steps of forming a predetermined interrupted design of deposit areas on the surface of a metal cathode and masking portions of the cathode surface between the deposit areas, leaving exposed said design, electrolytically depositing metal on said design on the cathode, pressing a mass of plastic against the cathode and over the deposited metal, stripping said plastic with the interrupted deposit adhering thereto as a unitary composite article of manufacture and reusing the masked cathode in the manner aforesaid to produce additional identical composite articles of manufacture.

12. In a method of making a composite metal and plastic article, the steps of electrolytically depositing a predetermined interrupted pattern of metal directly on and in contact with portions of the metal surface of a given cathode area leaving other portions between the metal pattern portions free of deposit, applying a predetermined mass of plastic over both the metal deposit portions and the uncoated portions of the cathode area, subjecting said plastic to pressure and heat to embed the metal deposit in the plastic and stripping the plastic from said cathode area with the metal held thereon in the shape in which it is deposited.

13. In a method of making a composite metal and plastic article, the steps of electrolytically depositing a predetermined pattern of metal directly on and in contact with the metal surface of a given cathode area, applying a predetermined mass of plastic to said area over said pattern subjecting said plastic to pressure and heat to embed the metal deposit in the plastic, stripping the plastic with the metal thereon from said cathode area, pressing said metal and plastic composite against another similar composite to join them together in a unitary structure and then interconnecting the metal deposits in the several plastic layers.

REINHARDT N. SABEE.
CHARLES S. WHITE.

REFERENCES CITED

The following references are of record in the file of this patent:

UNITED STATES PATENTS

| Number | Name | Date |
|---|---|---|
| 633,315 | Heergeist | Sept. 19, 1899 |
| 634,523 | Epp | Oct. 10, 1899 |
| 676,357 | Endruweit | June 11, 1901 |
| 1,442,445 | Romano | Jan. 16, 1923 |
| 1,477,109 | Cowper-Coles | Dec. 11, 1923 |
| 1,635,541 | Conrad | July 12, 1927 |
| 1,713,951 | Danielson | May 21, 1929 |
| 1,804,021 | Miller | May 5, 1931 |
| 1,974,763 | Wirth | Sept. 25, 1934 |
| 2,019,625 | O'Brien | Nov. 5, 1935 |
| 2,066,511 | Arlt | Jan. 5, 1937 |
| 2,069,227 | Eichstadt | Feb. 2, 1937 |
| 2,166,366 | Norris | July 18, 1939 |
| 2,297,488 | Luderitz | Sept. 29, 1942 |